US 11,608,263 B2

(12) United States Patent
Umemura et al.

(10) Patent No.: US 11,608,263 B2
(45) Date of Patent: Mar. 21, 2023

(54) FLUID LOADING JOINT AND FLUID LOADING EQUIPMENT

(71) Applicants: KAWASAKI JUKOGYO KABUSHIKI KAISHA, Kobe (JP); TB GLOBAL TECHNOLOGIES LTD., Tokyo (JP); T.EN LOADING SYSTEMS S.A.S., Sens (FR)

(72) Inventors: Tomoaki Umemura, Kobe (JP); Tsutomu Kawai, Nagaoka (JP)

(73) Assignees: KAWASAKI JUKOGYO KABUSHIKI KAISHA, Kobe (JP); TB GLOBAL TECHNOLOGIES LTD., Tokyo (JP); T.EN LOADING SYSTEMS S.A.S., Sens (FR)

( * ) Notice: Subject to any disclaimer, the term of this patent is extended or adjusted under 35 U.S.C. 154(b) by 258 days.

(21) Appl. No.: 16/958,806

(22) PCT Filed: Dec. 26, 2018

(86) PCT No.: PCT/JP2018/047905
§ 371 (c)(1),
(2) Date: Jun. 29, 2020

(87) PCT Pub. No.: WO2019/131783
PCT Pub. Date: Jul. 4, 2019

(65) Prior Publication Data
US 2021/0061640 A1    Mar. 4, 2021

(30) Foreign Application Priority Data

Dec. 28, 2017    (JP) .............................. JP2017-254139

(51) Int. Cl.
*F16L 25/02*    (2006.01)
*F16L 59/075*    (2006.01)
(Continued)

(52) U.S. Cl.
CPC ................ *B67D 9/02* (2013.01); *F16L 39/04* (2013.01); *F16L 59/065* (2013.01); *F16L 25/02* (2013.01); *F16L 59/075* (2013.01); *F16L 59/18* (2013.01)

(58) Field of Classification Search
CPC ....... F16L 39/04; F16L 39/06; F16L 27/0828; F16L 59/075; F16L 25/02; F16L 25/026; F16L 27/087; F16L 23/02
See application file for complete search history.

(56) References Cited

U.S. PATENT DOCUMENTS

| 236,519 | A | * | 1/1881 | Walsh | ...................... F16L 39/06 285/356 |
| 2,877,026 | A | * | 3/1959 | Payne | ...................... F16L 39/04 277/408 |
| 2,957,709 | A | * | 10/1960 | Skarstrom | ............... F16L 39/04 285/96 |

(Continued)

FOREIGN PATENT DOCUMENTS

| DE | 3819390 A1 * 12/1989 | ............ F16L 27/087 |
| FR | 1399258 A    5/1965 | |

(Continued)

*Primary Examiner* — Zachary T Dragicevich
*Assistant Examiner* — Fannie C Kee
(74) *Attorney, Agent, or Firm* — Oliff PLC (57) ABSTRACT

A fluid loading joint includes: a first half provided at an end of a first vacuum double pipe, the first half including a first inner pipe, a first outer pipe, and a first blocking member blocking between the first inner pipe and the first outer pipe; a second half provided at an end of a second vacuum double pipe, the second half including a second inner pipe, a second outer pipe, and a second blocking member blocking between the second inner pipe and the second outer pipe; an annular inner insulator interposed between the first inner pipe and the second inner pipe; and an annular outer insulator interposed between the first outer pipe and the second outer pipe, the outer insulator surrounding the inner insulator, with a gas space positioned between the outer insulator and the inner (Continued)

insulator, the gas space being formed between the first blocking member and the second blocking member.

4 Claims, 5 Drawing Sheets

(51) Int. Cl.
  *B67D 9/02* (2010.01)
  *F16L 39/04* (2006.01)
  *F16L 59/065* (2006.01)
  *F16L 59/18* (2006.01)

(56) References Cited

U.S. PATENT DOCUMENTS

| | | | |
|---|---|---|---|
| 3,020,057 A * | 2/1962 | Gamet | F16L 39/04 279/4.12 |
| 3,180,661 A * | 4/1965 | Porath | F16L 39/04 285/93 |
| 3,371,946 A | 3/1968 | Bleyle, Jr. et al. | |
| 3,775,989 A | 12/1973 | Mursinna et al. | |
| 3,923,133 A * | 12/1975 | Chivari | F16L 27/087 416/157 R |
| 4,040,338 A * | 8/1977 | Wilson | F16L 39/04 91/1 |
| 4,325,540 A * | 4/1982 | Seki | F16L 39/04 266/245 |
| 5,199,748 A * | 4/1993 | Jung | F16L 27/087 285/121.5 |
| 6,186,509 B1 * | 2/2001 | Wada | F16L 39/04 277/363 |
| 8,113,545 B2 * | 2/2012 | Takahashi | F16L 27/087 277/408 |
| 2018/0187821 A1 * | 7/2018 | Takami | F16L 27/0828 |
| 2019/0107236 A1 * | 4/2019 | Petrou | F16L 39/04 |

FOREIGN PATENT DOCUMENTS

| | | | | |
|---|---|---|---|---|
| JP | 2004084691 A * | 3/2004 | | F16L 27/0828 |
| JP | 2017-019531 A | 1/2017 | | |

* cited by examiner

FLUID LOADING JOINT AND FLUID LOADING EQUIPMENT

TECHNICAL FIELD

The present invention relates to a fluid loading joint that connects vacuum double pipes to each other, and also relates to fluid loading equipment including the fluid loading joint.

BACKGROUND ART

In recent years, development has been conducted on fluid loading equipment (loading arm) intended for liquefied hydrogen, which is installed at, for example, a harbor or port. A vacuum double pipe having high thermal insulation performance is used for such fluid loading equipment. The vacuum double pipe includes a conduit pipe and an accommodating pipe. Liquefied hydrogen flows through the inside of the conduit pipe. The accommodating pipe accommodates the conduit pipe therein. A vacuum is drawn on the space between the conduit pipe and the accommodating pipe.

Figure 5:
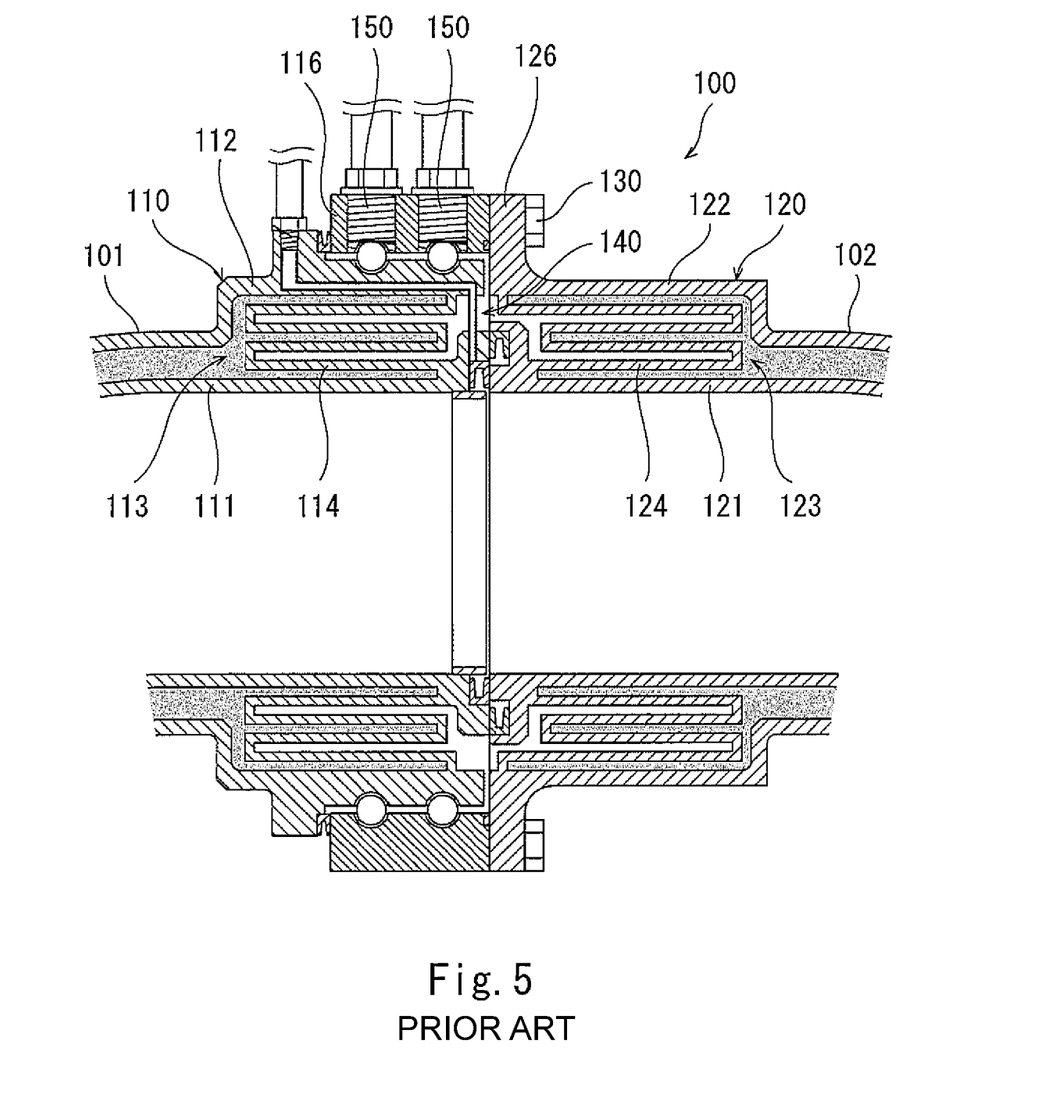
FIG. 5 is a sectional view of a conventional fluid loading joint.

Not only such vacuum double pipes, but also a fluid loading joint that connects the vacuum double pipes to each other is required to have high thermal insulation performance. For example, Patent Literature 1 discloses a fluid loading joint 100 as shown in FIG. 5. The fluid loading joint 100 is a swivel joint, and includes a first half 110 and a second half 120. The first half 110 is provided at an end of a first vacuum double pipe 101, and the second half 120 is provided at an end of a second vacuum double pipe 102.

A first vacuum space 113 is formed between a first inner pipe 111 and a first outer pipe 112 of the first half 110. A first blocking member 114 blocks between the first inner pipe 111 and the first outer pipe 112. The first half 110 includes a cylindrical holder 116, which holds the first outer pipe 112 such that the first outer pipe 112 is rotatable.

A second vacuum space 123 is formed between a second inner pipe 121 and a second outer pipe 122 of the second half 120. A second blocking member 124 blocks between the second inner pipe 121 and the second outer pipe 122. An outer flange 126 is provided at the distal end of the second outer pipe 122. The outer flange 126 is fastened to the holder 116 of the first half 110 by bolts 130.

The aforementioned first blocking member 114 is located at a position deeper than the joint surface of the first half 110, and the second blocking member 124 is located at a position deeper than the joint surface of the second half 120. A gas space 140 is formed between the first blocking member 114 and the second blocking member 124. The gas space 140 is filled with helium gas through port members 150.

CITATION LIST

Patent Literature

PTL 1: Japanese Laid-Open Patent Application Publication No. 2017-19531

SUMMARY OF INVENTION

Technical Problem

The fluid loading joint, which is disposed at a particular part of the fluid loading equipment, is required to electrically insulate the first half and the second half from each other. However, just sandwiching one annular insulation sheet between the first half and the second half will allow external heat to enter the inside of the passage due to thermal conduction through the insulation sheet. This may cause deterioration in thermal insulation performance.

In view of the above, an object of the present invention is to provide a fluid loading joint that is capable of electrically insulating the first half and the second half from each other and has high thermal insulation performance, and to provide fluid loading equipment including the fluid loading joint.

Solution to Problem

In order to solve the above-described problems, a fluid loading joint according to the present invention includes: a first half provided at an end of a first vacuum double pipe, the first half including a first inner pipe, a first outer pipe, and a first blocking member, the first outer pipe forming a vacuum space between the first inner pipe and the first outer pipe, the first blocking member blocking between the first inner pipe and the first outer pipe; a second half provided at an end of a second vacuum double pipe, the second half including a second inner pipe, a second outer pipe, and a second blocking member, the second outer pipe forming a vacuum space between the second inner pipe and the second outer pipe, the second blocking member blocking between the second inner pipe and the second outer pipe and forming a gas space between the first blocking member and the second blocking member, the gas space being filled with gas; an annular inner insulator interposed between the first inner pipe and the second inner pipe; and an annular outer insulator interposed between the first outer pipe and the second outer pipe, the outer insulator surrounding the inner insulator, with the gas space positioned between the outer insulator and the inner insulator.

According to the above configuration, the inner insulator is interposed between the first inner pipe and the second inner pipe, and the outer insulator is interposed between the first outer pipe and the second outer pipe. This makes it possible to electrically insulate the first half and the second half from each other. In addition, the inner insulator and the outer insulator are spaced apart from each other, with the gas space positioned therebetween. Therefore, the transfer of external heat from the outer insulator to the inner insulator is suppressed, which makes it possible to achieve high thermal insulation performance.

For example, a first inner flange may be provided at a distal end of the first inner pipe. A second inner flange may be provided at a distal end of the second inner pipe. The inner insulator may be interposed between the first inner flange and the second inner flange.

The fluid loading joint may be a swivel joint. The first half may include a cylindrical holder that holds the first outer pipe such that the first outer pipe is rotatable. An outer flange that is fastened to the holder may be provided at a distal end of the second outer pipe. The outer insulator may be interposed between the holder and the outer flange. According to this configuration, the outer insulator can be fixed by utilizing a fastening structure for fastening the outer flange to the holder.

The above fluid loading joint may further include a spacer interposed between the first inner flange and the second inner flange, the spacer being fastened to the second inner flange and slidable on the first inner flange. The inner insulator may be sandwiched between the spacer and the second inner flange. According to this configuration, the inner insulator can be fixed with a simple structure while keeping the clearance of the sliding part small by the spacer.

For example, the fluid loading joint may be a fixed joint. A first outer flange may be provided at a distal end of the first outer pipe. A second outer flange that is fastened to the first outer flange may be provided at a distal end of the second outer pipe. The inner insulator may be sandwiched between the first inner flange and the second inner flange. The outer insulator may be sandwiched between the first outer flange and the second outer flange.

The above fluid loading joint may further include a positioning mechanism that restricts movement of the inner insulator in a radial direction. According to this configuration, the inner insulator can be kept at a normal position.

Fluid loading equipment according to the present invention includes the above fluid loading joint.

Advantageous Effects of Invention

The present invention provides a fluid loading joint that is capable of electrically insulating the first half and the second half from each other and has high thermal insulation performance.

DESCRIPTION OF EMBODIMENTS

Embodiment 1

Figure 1:
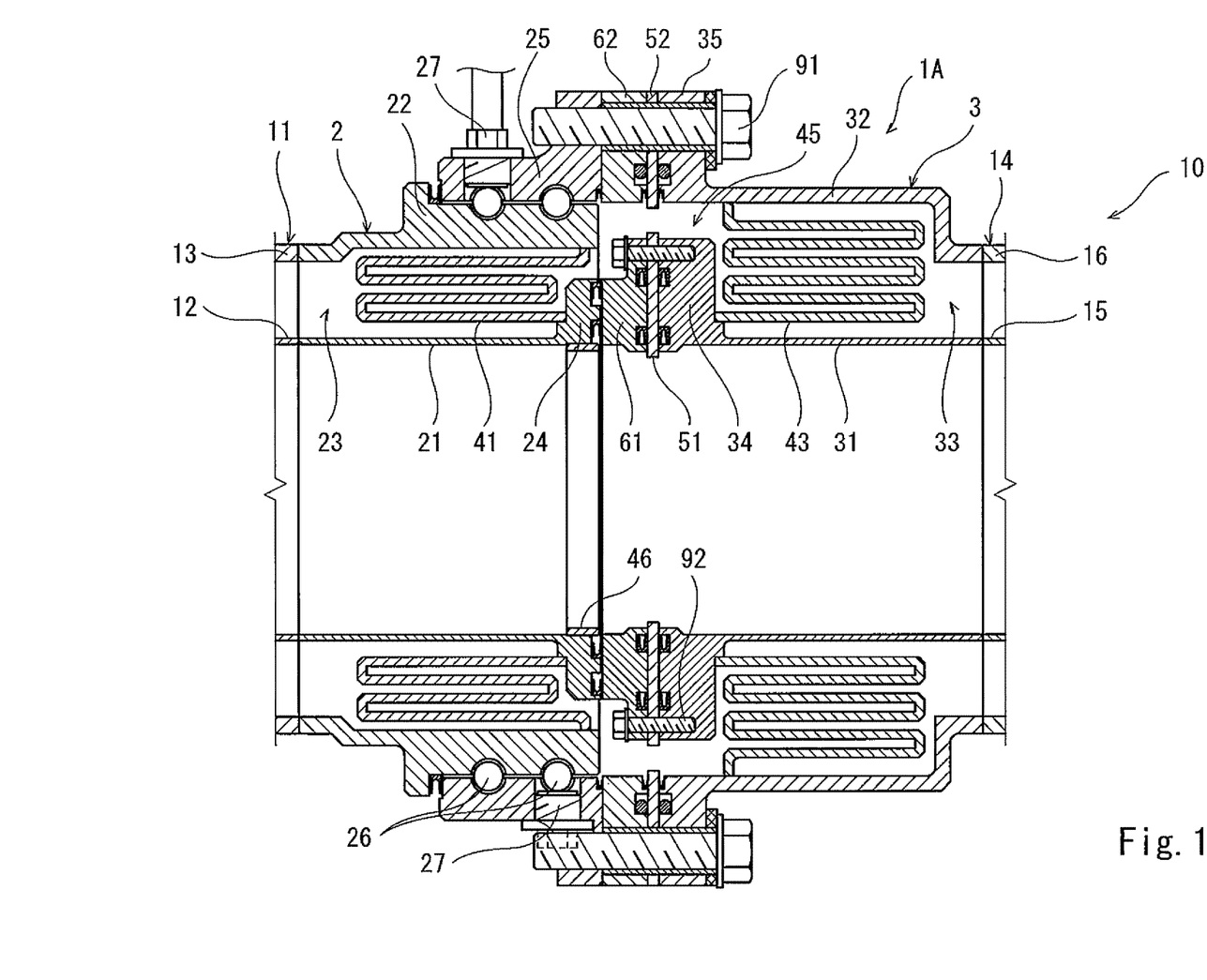
FIG. 1 is a sectional view of a fluid loading joint according to Embodiment 1 of the present invention.
Figure 2:
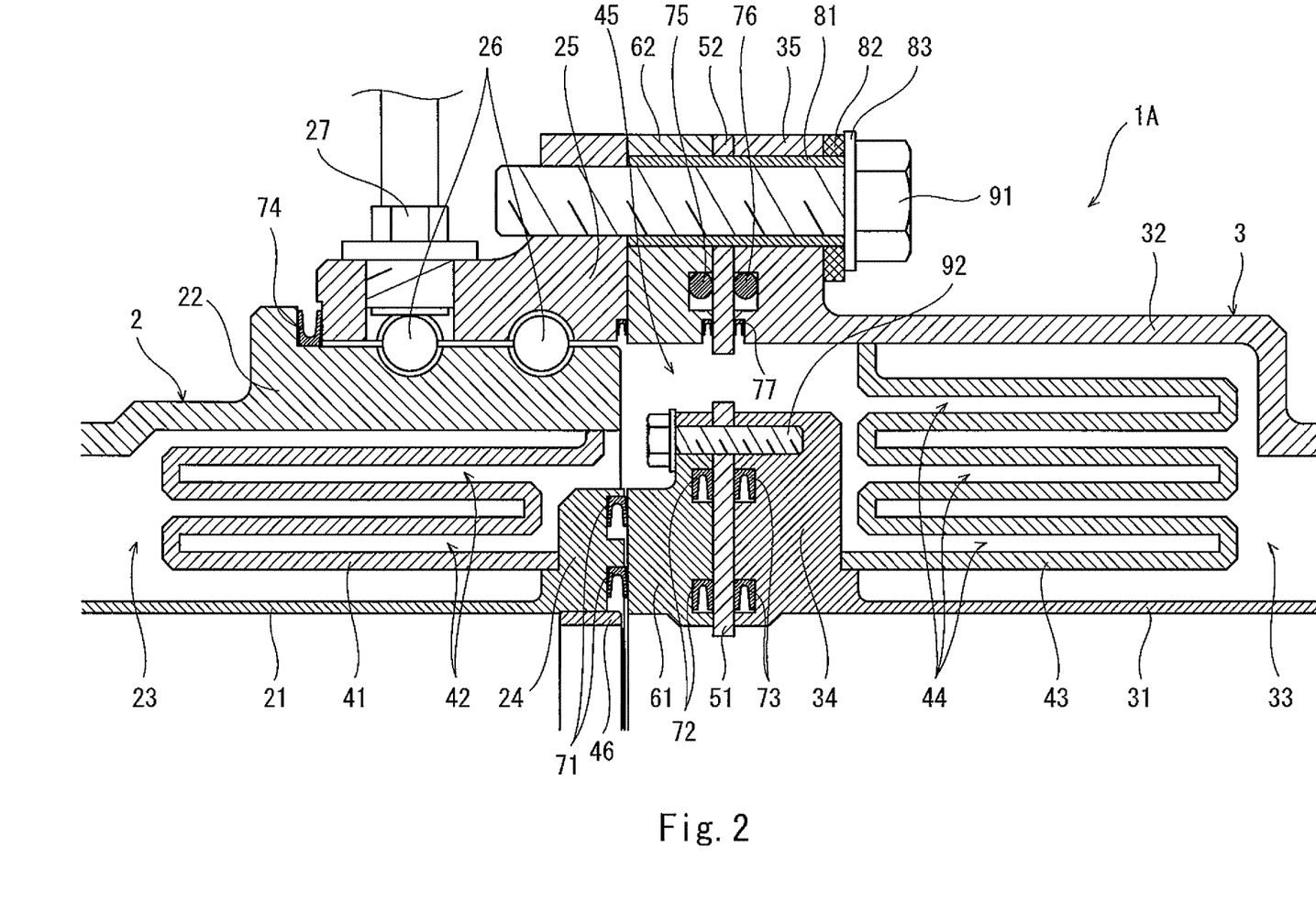
FIG. 2 is an enlarged view of a part of FIG. 1.

FIG. 1 and FIG. 2 show a fluid loading joint 1A according to Embodiment 1 of the present invention. The fluid loading joint 1A constitutes a part of fluid loading equipment (loading arm) 10 intended for liquefied hydrogen. The fluid loading equipment (loading arm) 10 is connected to, for example, a liquefied hydrogen carrier ship.

The fluid loading joint 1A connects a first vacuum double pipe 11 and a second vacuum double pipe 14 to each other. In the present embodiment, the fluid loading joint 1A is a swivel joint. The fluid loading joint 1A includes a first half 2 and a second half 3. The first half 2 is provided at an end of the first vacuum double pipe 11. The second half 3 is provided at an end of the second vacuum double pipe 14.

The first vacuum double pipe 11 includes a first conduit pipe 12 and a first accommodating pipe 13. Liquefied hydrogen flows through the inside of the first conduit pipe 12. The first accommodating pipe 13 accommodates the first conduit pipe 12 therein. A vacuum is drawn on the space between the first conduit pipe 12 and the first accommodating pipe 13. Similarly, the second vacuum double pipe 14 includes a second conduit pipe 15 and a second accommodating pipe 16. Liquefied hydrogen flows through the inside of the second conduit pipe 15. The second accommodating pipe 16 accommodates the second conduit pipe 15 therein. A vacuum is drawn on the space between the second conduit pipe 15 and the second accommodating pipe 16.

The first half 2 includes a first inner pipe 21 and a first outer pipe 22. The first outer pipe 22 accommodates the first inner pipe 21 therein. The first conduit pipe 12 is joined, for example by welding, to the proximal end of the first inner pipe 21 (i.e., the opposite end from the second half 3). The first accommodating pipe 13 is joined, for example by welding, to the proximal end of the first outer pipe 22. A first vacuum space 23 is formed between the first inner pipe 21 and the first outer pipe 22. It should be noted that the position of the proximal end of the first inner pipe 21 and the position of the proximal end of the first outer pipe 22 may be shifted from each other in the axial direction.

Similarly, the second half 3 includes a second inner pipe 31 and a second outer pipe 32. The second outer pipe 32 accommodates the second inner pipe 31 therein. The second conduit pipe 15 is joined, for example by welding, to the proximal end of the second inner pipe 31 (i.e., the opposite end from the first half 2). The second accommodating pipe 16 is joined, for example by welding, to the proximal end of the second outer pipe 32. A second vacuum space 33 is formed between the second inner pipe 31 and the second outer pipe 32. It should be noted that the position of the proximal end of the second inner pipe 31 and the position of the proximal end of the second outer pipe 32 may be shifted from each other in the axial direction.

The first outer pipe 22 and the second outer pipe 32 expand in diameter, except at their proximal end portions. In the present embodiment, as mentioned above, the fluid loading joint 1A is a swivel joint. The first half 2 is the movable side, and the second half 3 is the fixed side. For this reason, the internal diameter of the distal end of the second outer pipe 32 is greater than the internal diameter of the distal end of the first outer pipe 22.

The first half 2 further includes an annular first blocking member 41, which blocks between the first inner pipe 21 and the first outer pipe 22. In the present embodiment, the first blocking member 41 is located at a position deeper than the joint surface of the first half 2 (the joint surface is constituted by the distal end surface of a first inner flange 24 and the distal end surface of a holder 25; the first inner flange 24 and the holder 25 will be described below). Further, in the present embodiment, the inner end portion of the first blocking member 41 is joined to the proximal end surface of the first inner flange 24, which is provided at the distal end of the first inner pipe 21. The outer end portion of the first blocking member 41 is joined to the inner circumferential surface of the first outer pipe 22 at a position that is slightly shifted from the distal end of the first outer pipe 22 (i.e., the end facing the second half 3) toward the proximal end of the first outer pipe 22.

The first blocking member 41 includes at least one annular groove 42, which is recessed into the first vacuum space 23 along the first inner pipe 21. It should be noted that, desirably, a plurality of concentric annular grooves 42 are provided such that the first blocking member 41 is bellows-shaped when seen in a sectional view. In the present embodiment, the first blocking member 41 includes two concentric annular grooves 42. Desirably, the annular grooves 42 are made sufficiently deep. For example, the depth of the annular grooves 42 may be greater than the distance from the first inner pipe 21 to the first outer pipe 22, the distance being measured at a position where the first blocking member 41 is present.

The space between the first blocking member 41 and the first inner pipe 21, the space between the first blocking member 41 and the first outer pipe 22, and the space between the annular grooves 42 of the first blocking member 41 are part of the aforementioned first vacuum space 23. On the other hand, as described below, the inside of the annular grooves 42 is filled with helium gas. In this manner, vacuum layers and helium gas layers are alternately formed by the first blocking member 41 in the radial direction.

Similarly, the second half 3 further includes an annular second blocking member 43, which blocks between the second inner pipe 31 and the second outer pipe 32. In the present embodiment, the second blocking member 43 is located at a position deeper than the joint surface of the second half 3 (the joint surface is constituted by the distal end surface of a second inner flange 34 and the distal end surface of a second outer flange 35; the second inner flange 34 and the second outer flange 35 will be described below). Further, in the present embodiment, the inner end portion of the second blocking member 43 is joined to the proximal end surface of the second inner flange 34, which is provided at the distal end of the second inner pipe 31. The outer end portion of the second blocking member 43 is joined to the inner circumferential surface of the second outer pipe 32 at a position that is slightly shifted from the distal end of the second outer pipe 32 (i.e., the end facing the first half 2) toward the proximal end of the second outer pipe 32.

The second blocking member 43 includes at least one annular groove 44, which is recessed into the second vacuum space 33 along the second inner pipe 31. It should be noted that, desirably, a plurality of concentric annular grooves 44 are provided such that the second blocking member 43 is bellows-shaped when seen in a sectional view. In the present embodiment, the second blocking member 43 includes three concentric annular grooves 44. Desirably, the annular grooves 44 are made sufficiently deep. For example, the depth of the annular grooves 44 may be greater than the distance from the second inner pipe 31 to the second outer pipe 32, the distance being measured at a position where the second blocking member 43 is present.

The space between the second blocking member 43 and the second inner pipe 31, the space between the second blocking member 43 and the second outer pipe 32, and the spaces between the annular grooves 44 of the second blocking member 43 are part of the aforementioned second vacuum space 33. On the other hand, as described below, the inside of the annular grooves 44 is filled with helium gas. In this manner, vacuum layers and helium gas layers are alternately formed by the second blocking member 43 in the radial direction.

An annular inner spacer 61 and an annular inner insulator 51 are interposed between the first inner flange 24 and the second inner flange 34. The cylindrical holder 25, an annular outer spacer 62, and an annular outer insulator 52 are interposed between the first outer pipe 22 and the second outer pipe 32.

The holder 25 is a component of the first half 2, and holds the first outer pipe 22 via bearings 26, such that the first outer pipe 22 is rotatable. Meanwhile, the second outer flange 35 is provided at the distal end of the second outer pipe 32. The outer spacer 62 and the outer insulator 52 are interposed between the holder 25 and the second outer flange 35. To be more specific, the outer insulator 52 is sandwiched between the outer spacer 62 and the second outer flange 35.

The second outer flange 35 is fastened to the holder 25 by bolts 91. Each of the outer insulator 52 and the outer spacer 62 is provided with insertion holes for the bolts 91. In the present embodiment, the holder 25 is provided with screw holes in which the bolts 91 are screwed. Alternatively, instead of the screw holes, the holder 25 may be provided with insertion holes, and in this case, nuts may be used.

The inner spacer 61 is disposed inside the outer spacer 62, and has the same thickness as that of the outer spacer 62. However, the inner spacer 61 and the outer spacer 62 may have different thicknesses from each other. Each of the inner spacer 61 and the outer spacer 62 is made of a metal.

The inner insulator 51 is disposed inside the outer insulator 52, and has the same thickness as that of the outer insulator 52. However, the inner insulator 51 and the outer insulator 52 may have different thicknesses from each other. Each of the inner insulator 51 and the outer insulator 52 is made of an insulating material (e.g., a resin such as commodity plastic or engineering plastic).

The inner spacer 61 is fastened to the second inner flange 34 by bolts 92, and slides on the first inner flange 24. Sealing members 71 for preventing the liquefied hydrogen from leaking through a gap between the first inner flange 24 and the inner spacer 61 are disposed between the first inner flange 24 and the inner spacer 61. It should be noted that a slight clearance is formed between the first inner flange 24 and the inner spacer 61, and the sealing members 71 held by the first inner flange 24 slide on the inner spacer 61. In the present embodiment, a ring 46 is fitted to the distal end of the first inner pipe 21, such that the ring 46 obscures the inner sealing members 71 from the inside.

The inner insulator 51 is sandwiched between the inner spacer 61 and the second inner flange 34. The inner insulator 51 is provided with insertion holes for the bolts 92. Sealing members 72 for preventing the liquefied hydrogen from leaking through a gap between the inner spacer 61 and the inner insulator 51 are disposed between the inner spacer 61 and the inner insulator 51, and sealing members 73 for preventing the liquefied hydrogen from leaking through a gap between the inner insulator 51 and the second inner flange 34 are disposed between the inner insulator 51 and the second inner flange 34.

A gap between the inner spacer 61 and the outer spacer 62, and a gap between the inner insulator 51 and the outer insulator 52, communicate with a space between the distal end of the first inner pipe 21 and the distal end of the first outer pipe 22, the space having the first blocking member 41 as its bottom, and a space between the distal end of the second inner pipe 31 and the distal end of the second outer pipe 32, the space having the second blocking member 43 as its bottom. These gaps and spaces constitute a gas space 45. In other words, the gas space 45 is formed between the first blocking member 41 and the second blocking member 43; the outer spacer 62 surrounds the inner spacer 61, with the gas space 45 positioned between the outer spacer 62 and the inner spacer 61; and the outer insulator 52 surrounds the inner insulator 51, with the gas space 45 positioned between the outer insulator 52 and the inner insulator 51.

The gas space 45 is filled with helium gas. Port members 27 for supplying the helium gas to the gas space 45 through a gap between the first outer pipe 22 and the holder 25 are mounted to the holder 25.

A sealing member 74 for preventing the entry of outside water is disposed between the first outer pipe 22 and the holder 25. Sealing members 75 to 77 for preventing hydrogen gas from leaking to the outside are disposed between the holder 25, the outer spacer 62, the outer insulator 52, and the second outer flange 35 so that the hydrogen gas will be prevented from leaking to the outside even when the liquefied hydrogen has leaked into the gas space 45 beyond the sealing members 71, 72, and 73. These sealing members 74 to 77 also serve to prevent the helium gas from leaking to the outside.

The aforementioned bolts 91, which fasten the second outer flange 35 to the holder 25, are made of a metal. Accordingly, sleeves 81 made of an insulating material are inserted in the aforementioned insertion holes for the bolts 91, the insertion holes being provided in the outer insulator 52 and the outer spacer 62. Seats 82 made of an insulating material are disposed between the second outer flange 35 and washers 83, which contact the heads of the respective bolts 91.

On the other hand, the aforementioned bolts 92, which fasten the inner spacer 61 to the second inner flange 34, are made of an insulating material. Alternatively, the bolts 92 may be made of a metal, and the same insulation measures as those adopted for the bolts 91 may be adopted for the bolts 92.

As described above, in the fluid loading joint 1A of the present embodiment, the inner insulator 51 is interposed between the first inner pipe 21 and the second inner pipe 31, and the outer insulator 52 is interposed between the first outer pipe 22 and the second outer pipe 32. This makes it possible to electrically insulate the first half 2 and the second half 3 from each other. In addition, the inner insulator 51 and the outer insulator 52 are spaced apart from each other, with the gas space 45 positioned therebetween. Therefore, the transfer of external heat from the outer insulator 52 to the inner insulator 51 is suppressed, which makes it possible to achieve high thermal insulation performance.

Further, in the present embodiment, since the outer insulator 52 is interposed between the holder 25 and the second outer flange 35, the outer insulator 52 can be fixed by utilizing the fastening structure (i.e., the bolts 91) for fastening the second outer flange 35 to the holder 25.

Still further, in the present embodiment, since the inner insulator 51 is sandwiched between the inner spacer 61 and the second inner flange 34, the inner insulator 51 can be fixed with a simple structure while keeping the clearance of the sliding part small by the inner spacer 61.

Embodiment 2

Figure 3:
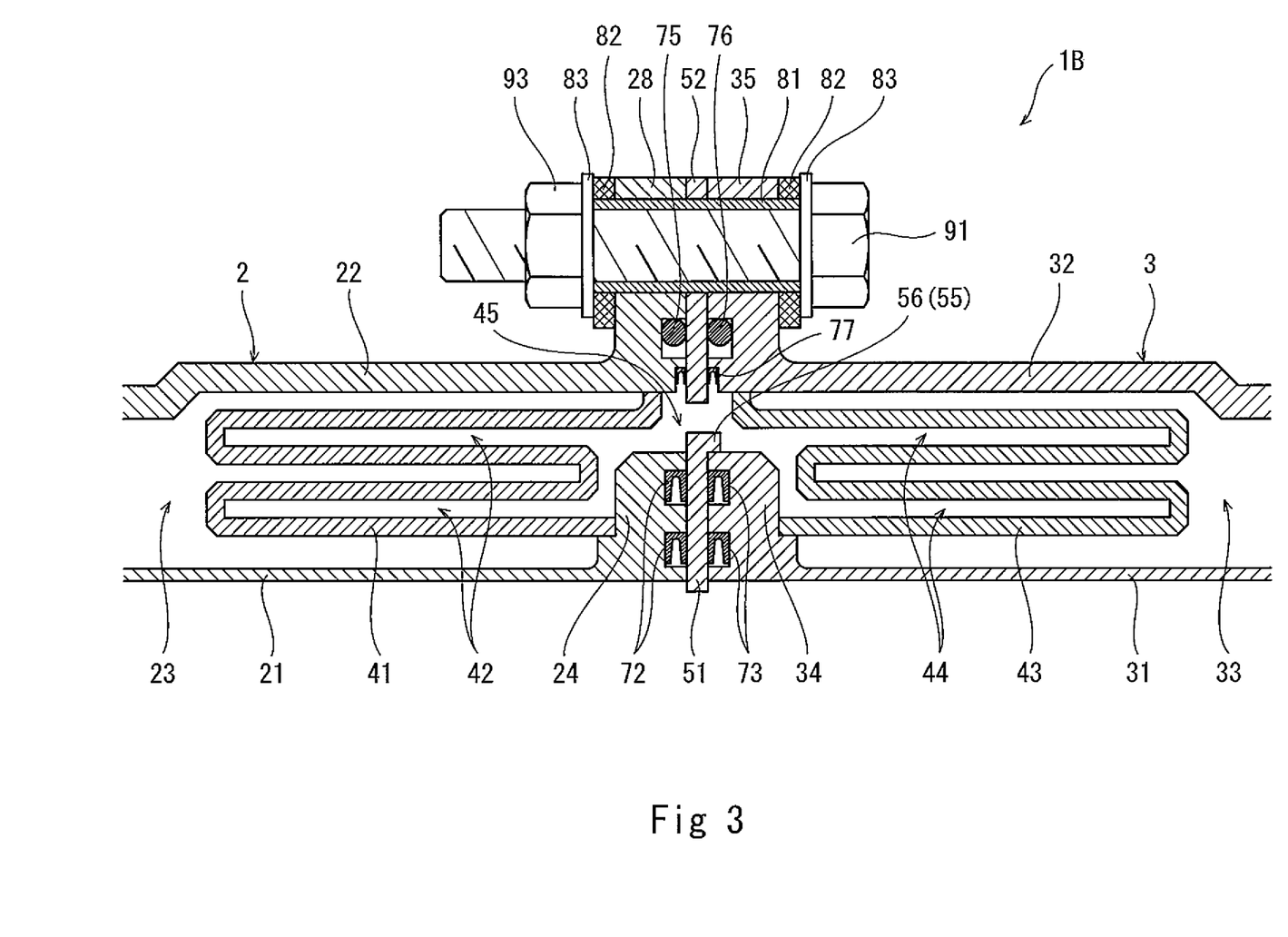
FIG. 3 is an enlarged sectional view of a part of a fluid loading joint according to Embodiment 2 of the present invention.

FIG. 3 shows a fluid loading joint 1B according to Embodiment 2 of the present invention. It should be noted that, in the present embodiment, the same components as those described in Embodiment 1 are denoted by the same reference signs as those used in Embodiment 1, and repeating the same descriptions is avoided.

In the present embodiment, the fluid loading joint 1B is a fixed joint. Therefore, the first half 2 and the second half 3 have symmetrical shapes with each other.

Specifically, a first outer flange 28 is provided at the distal end of the first outer pipe 22 of the first half 2. The second outer flange 35, which is provided at the distal end of the second outer pipe 32, is fastened to the first outer flange 28 by the bolts 91 and nuts 93. In the present embodiment, the washers 83, and the seats 82 made of an insulating material, are disposed also between the nuts 93 and the first outer flange 28.

In the present embodiment, the inner insulator 51 is sandwiched between the first inner flange 24 and the second inner flange 34, and the outer insulator 52 is sandwiched between the first outer flange 28 and the second outer flange 35. The sealing members 72 for preventing the liquefied hydrogen from leaking through a gap between the first inner flange 24 and the inner insulator 51 are disposed between the first inner flange 24 and the inner insulator 51, and the sealing members 73 for preventing the liquefied hydrogen from leaking through a gap between the inner insulator 51 and the second inner flange 34 are disposed between the inner insulator 51 and the second inner flange 34.

In the present embodiment, the gas space 45 formed between the first blocking member 41 and the second blocking member 43 is filled with hydrogen gas. The hydrogen gas is a result of evaporation of the liquefied hydrogen that has leaked through the gap between the first inner flange 24 and the inner insulator 51 and the gap between the inner insulator 51 and the second inner flange 34. Between the first outer flange 28 and the outer insulator 52, and between the outer insulator 52 and the second outer flange 35, the sealing members 75 to 77 for preventing the hydrogen gas from leaking through a gap between the first outer flange 28 and the outer insulator 52 and a gap between the outer insulator 52 and the second outer flange 35 are disposed.

The present embodiment further adopts a positioning mechanism 55, which restricts the movement of the inner insulator 51 in the radial direction. The positioning mechanism 55 of the present embodiment is a protrusion 56, which is provided on the outer circumferential edge portion of the inner insulator 51 and protrudes along the outer circumferential surface of the second inner flange 34.

Also in the present embodiment, similar to Embodiment 1, the first half 2 and the second half 3 can be electrically insulated from each other, and high thermal insulation performance can be achieved. In addition, since the present embodiment adopts the positioning mechanism 55, the inner insulator 51 can be kept at a normal position.

Figure 4:
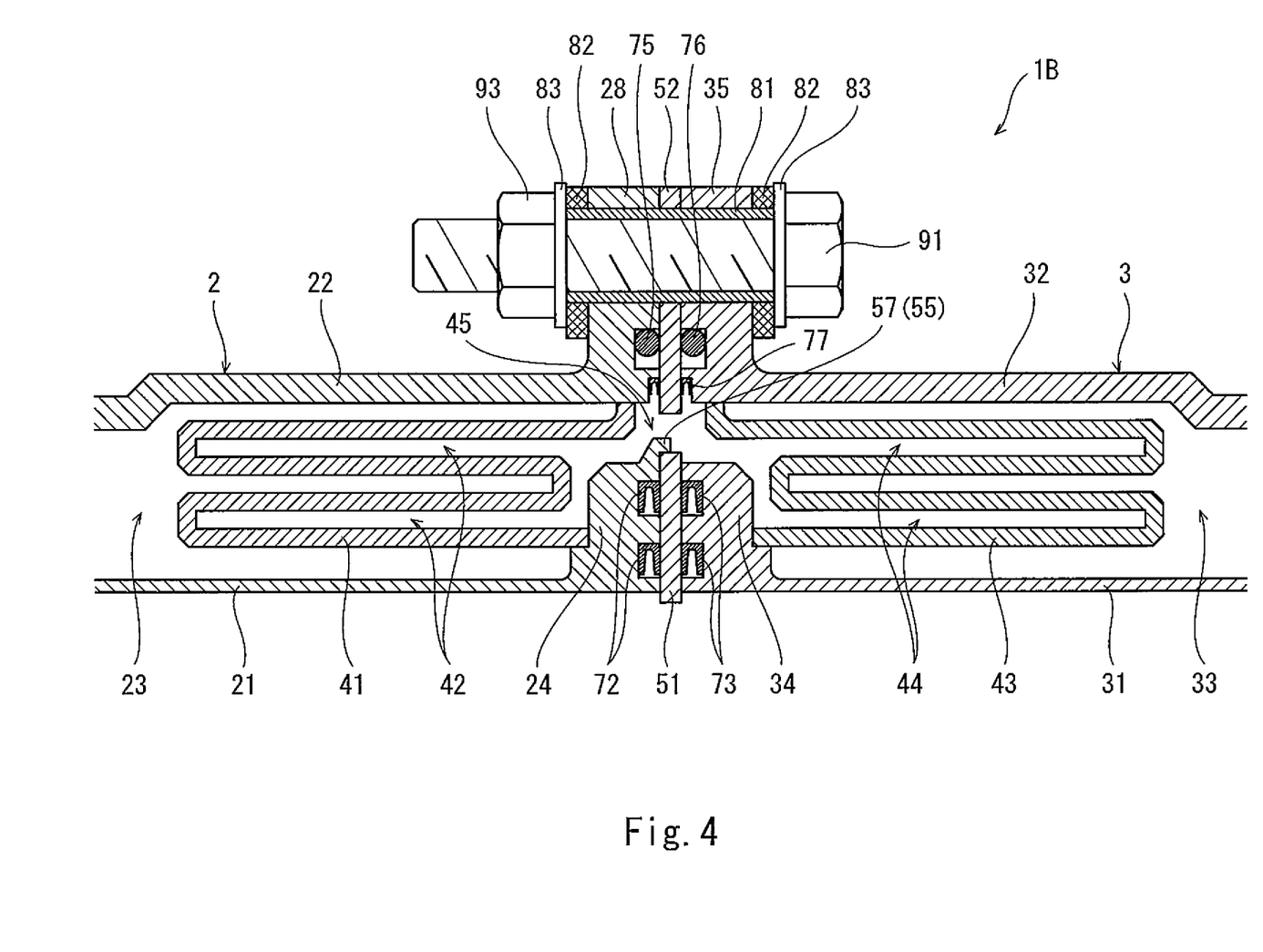
FIG. 4 shows a variation of Embodiment 2.

It should be noted that the positioning mechanism 55 need not be the protrusion 56 provided on the outer circumferential edge portion of the inner insulator 51. For example, as shown in FIG. 4, the positioning mechanism 55 may be a protrusion 57, which is provided on the first inner flange 24 and engaged with the outer circumferential surface of the inner insulator 51.

Other Embodiments

The present invention is not limited to the above-described embodiments. Various modifications can be made without departing from the scope of the present invention.

For example, in Embodiment 1, the outer spacer 62 may be eliminated, and either one of the first outer pipe 22 or the second outer pipe 32 may be made longer by a length corresponding to the thickness of the outer spacer 62.

REFERENCE SIGNS LIST 1A, 1B fluid loading joint
10 fluid loading equipment
2 first half
21 first inner pipe
22 first outer pipe
23 first vacuum space
24 first inner flange
25 holder
28 first outer flange
3 second half
31 second inner pipe
32 second outer pipe
33 second vacuum space
34 second inner flange
35 second outer flange
41 first blocking member
43 second blocking member
45 gas space
51 inner insulator
52 outer insulator
55 positioning mechanism
61, 62 spacer

The invention claimed is:

1. A fluid loading joint that is a swivel joint, the fluid loading joint comprising:
   a first half provided at an end of a first vacuum double pipe, the first half including a first inner pipe, a first outer pipe, a first blocking member, and a cylindrical holder, the first inner pipe being provided with a first inner flange at a distal end of the first inner pipe, the first outer pipe forming a vacuum space between the first inner pipe and the first outer pipe, the first blocking member blocking between the first inner pipe and the first outer pipe, the cylindrical holder holding the first outer pipe such that the first outer pipe is rotatable;
   a second half provided at an end of a second vacuum double pipe, the second half including a second inner pipe, a second outer pipe, and a second blocking member, the second inner pipe being provided with a second inner flange at a distal end of the second inner pipe, the second outer pipe forming a vacuum space between the second inner pipe and the second outer pipe and being provided with an outer flange at a distal end of the second outer pipe, the outer flange being fastened to the holder, the second blocking member blocking between the second inner pipe and the second outer pipe and forming a gas space between the first blocking member and the second blocking member, the gas space being filled with gas;
   an annular inner insulator interposed between the first inner flange and the second inner flange; and
   an annular outer insulator interposed between the holder and the outer flange, the outer insulator surrounding the inner insulator, with the gas space positioned between the outer insulator and the inner insulator.

2. The fluid loading joint according claim 1, further comprising a spacer interposed between the first inner flange and the second inner flange, the spacer being fastened to the second inner flange and slidable on the first inner flange, wherein
   the inner insulator is sandwiched between the spacer and the second inner flange.

3. Fluid loading equipment comprising the fluid loading joint according to claim 2.

4. Fluid loading equipment comprising the fluid loading joint according to claim 1.

* * * * *